United States Patent [19]

Kartanson et al.

[11] 4,141,373
[45] Feb. 27, 1979

[54] METHOD FOR DEOILING METAL SCRAP

[75] Inventors: John M. Kartanson; Robert M. Neel, both of Winston-Salem, N.C.

[73] Assignee: RJR Archer, Inc., Winston-Salem, N.C.

[21] Appl. No.: 838,789

[22] Filed: Sep. 28, 1977

[51] Int. Cl.² ............................................. B08B 5/04
[52] U.S. Cl. ...................................... 134/21; 134/35; 134/105; 134/109; 29/403; 266/901; 110/236; 34/92; 432/205
[58] Field of Search ................ 432/1, 2, 13, 152, 175, 432/205, 266, 209; 266/901; 29/403; 110/236; 34/15, 39, 40, 51, 92; 13/31; 134/105, 109, 21, 35, 40

[56] References Cited

U.S. PATENT DOCUMENTS

| | | | |
|---|---|---|---|
| 2,977,962 | 4/1961 | Zucker | 134/21 |
| 3,242,575 | 3/1966 | Manaresi | 34/92 |
| 3,298,108 | 1/1967 | Seffinga | 34/92 |
| 3,453,741 | 7/1969 | King et al. | 34/92 |
| 3,495,019 | 2/1970 | Santi | 13/31 |
| 3,497,190 | 2/1970 | More | 110/236 |
| 3,627,289 | 12/1971 | Erman | 110/236 |
| 3,860,222 | 1/1975 | Tennehouse | 432/205 |
| 3,971,875 | 7/1976 | Regalbuto | 13/31 |
| 4,086,050 | 4/1978 | Luiten et al. | 432/205 |

Primary Examiner—Henry C. Yuen
Attorney, Agent, or Firm—Grover M. Myers

[57] ABSTRACT

This invention relates to a method of removing oil from metal scrap, comprising the steps of introducing oil-laden scrap into a hermetically sealed chamber, evacuating said chamber, heating said scrap to vaporize the oil, and removing the vaporized oil from said chamber.

8 Claims, 2 Drawing Figures

METHOD FOR DEOILING METAL SCRAP

BACKGROUND OF THE INVENTION

This invention relates to a method and apparatus for removing contaminants such as oil from metal scrap, and more particularly, for removing a processing oil from aluminum scrap either in briquet, loose form, etc.

In all industries today, the reprocessing of scrap is becoming more and more attractive from an economical standpoint, and this is primarily true because of the scarcity of the natural resources. In the metal industries, and in particular the aluminum industry, one of the major problems with regard to reprocessing scrap aluminum is the processing oil that remains on the scrap metal after it has been worked. Large amounts of sheet and foil scrap are generated in the production of sheets and light gauge foil products. Generally these scraps are contaminated with oil and additives having a wide boiling point range of between about 150° F. to 1100° F.

There are usually two basic types of oily scrap generated by rolling processes: (1) trim scrap; and (2) machine scrap. The trim scrap is produced when trimming the edges of the sheets during the rolling and coiling process or during the slitting process. Machine scrap is cut from the coils and consists of out-of-gauge materials, tails, rejected materials and returned goods. Scrap may also be generated due to unusable products such as wire, cable, automobile parts and machine shop turnings, etc. and can be of any shape or form. The scrap is usually briquetted for convenience of handling and storage with the trim scrap and machine scrap briquets having a density of approximately 30% and 40–60%, respectively, of virgin aluminum.

If the oil contaminated briquets are charged into a furnace, the oil catches fire and a black smoke is generated during the melting process. The fire generated by the burning oil increases the surface temperature of the briquets and creates additional oxides which result in dross and melt loss. The increased dross results in melt loss not only due to the formation of oxides but because pure metal is trapped in the dross. The amount of dross varies but, in an average melting operation, is approximately 20% recoverable aluminum by weight; therefore, the removal of the oil from scrap is most important because melt recovery is improved. An added advantage is that the air quality standards set by the Environmental Protection Agency (EPA) can be met more easily by reducing the amount of smoke generated during melting.

PRIOR ART STATEMENT

In compliance with requirements of Title 37 of CFR Sections 1.97 and 1.98, the following prior art is known:

U.S. Pat. Nos. 1,328,897; Re. 28,787; 3,705,711; 2,595,411; 3,627,289; 3,767,179; 2,836,901; 3,650,830; 3,839,086; 3,497,190; 3,693,951; 3,846,173.

The above listed prior art is considered relevant only in that it deals with apparatus and methods for removing oil from scrap metal. Several of the patents listed are discussed hereinbelow to provide an indication of the different deoiling processes which have previously been known.

One process illustrated in U.S. Pat. No. 3,846,173 to Ihrig utilizes a detergent solution to wash the contaminating oil from the scrap. Another general type of process for deoiling a metal scrap relies on burning off the oil by applying a fire to the scrap either by utilizing an external source of fuel or by utilizing the vaporized oil as a fuel. Of course, these processes form oxides on the scrap as well as generating the smoke which the present invention eliminates. An example of these processes are illustrated in U.S. Pat. Nos. 3,497,190 and Re. 28,787 to James E. Moore; and U.S. Pat. No. 3,705,711 to Seelandt et al.

U.S. Pat. No. 2,836,901 to Davis also discloses a method of drying metal scrap. In this method, gas is ignited in a burner and the hot gases given off by the combustion are circulated through a dryer containing the scrap metal. The pressure in the dryer is maintained above atmospheric pressure. The hot off gases vaporize a portion of the oil and the effluent from the dryer is directed into a precipitator where some of the heavier fractions of the evaporated cutting oil will be condensed and removed from the gas stream. As the hot gas passes through the water, steam is formed and flows out of the precipitator with the gas stream. This steam reduces the air in the off gases and, thereby, will reduce oxidation as more steam is added to the stream. The portion of the off gases from the precipitator is burned off in a flaring unit while the remaining mixture of off gases and steam is directed back into the burner where the vaporized light oil is ignited. This combustion produces the hot off gas which is again cycled through the system.

U.S. Pat. No. 3,650,830 to Mathis illustrates another method of recovering aluminum which has been formed into foil and has had organic compounds such as wax, plastic, lacquers, etc. applied to the foil. The scrap is heated in a non-oxidizing (e.g., carbonaceous) atmosphere to a sufficient temperature to evaporate the volatile contaminants, leaving the metal, carbon and ash which are later mechanically separated. The pressure in the furnace is maintained above atmospheric pressure to insure no oxygen is drawn into the furnace.

Finally, U.S. Pat. No. 1,328,897 discloses a method of drying moisture laden material by placing the material in an airtight chamber and circulating heated air therethrough. The air is circulated until the temperature reaches a sufficient level to vaporize the moisture into steam. The steam and air mixture are drawn out of the system by using a suction device, thereby removing the moisture from the system. If an inflammable material is being dried, the suction device is operated first to remove the air from the drying chamber to reduce the likelihood of the material burning or an explosion.

The remaining prior art listed above discloses other types of processes for removing oil from metal scraps, but these patents were considered no more relevant than the prior art discussed above.

SUMMARY OF THE INVENTION

It is, therefore, an object of this invention to provide a method and apparatus for removing volatile materials such as oil from metal scrap in order to reduce dross and increase the melt recovery of the scrap during melting.

Another object of this invention is to provide a deoiling method for metal scrap which does not burn off the vaporized oil and, thus, provides a way of maintaining air quality standards.

Another object of this invention is to provide a method of removing oil from scrap metal in a relatively air-free environment to prevent oxidation.

Another object of this invention is to provide a method in which the oil can be vaporized at a temperature below its normal boiling point.

Another object of this invention is to provide a method for removing oil from scrap in either a loose or bale form by heating the scrap in a non-oxidizing atmosphere at a reduced pressure to vaporize the oil and thereafter withdraw and condense the oil vapors from the systems.

Still another object of this invention is to provide a method for recovering processing oil from metal scrap.

These and other objects of the present invention are accomplished by the method comprising the steps of introducing oily scrap metal into a hermetically sealable chamber, partially evacuating the chamber and heating the scrap to a specific temperature to vaporize the oil and drawing the vaporize oil from the chamber. After the oil has been vaporized and withdrawn from the chamber, the scrap is cooled before repressurizing the chamber and removing the scrap. One method of heating the scrap is by circulating a heated inert gas within the chamber to vaporize the oil in a relatively oxygen-free environment.

BRIEF DESCRIPTION OF THE DRAWINGS

The foregoing and additional objects, features and advantages of the present invention will be apparent to those skilled in the art from the following detailed description of a preferred embodiment taken with the accompanying drawings, in which.

DESCRIPTION OF A PREFERRED EMBODIMENT

The present process for removing volatile materials such as rolling mill oil from scrap metal, in particular, aluminum, utilizes a hermetically sealable chamber which receives the oil-laden scrap to be deoiled. The scrap can be in a loose form including trimmings, tails, rejected or out-of-gauge metal, etc. or in bale or briquet form. After the scrap is introduced in the chamber and the chamber is hermetically sealed, a vacuum is drawn to remove most of the air from the chamber. In one embodiment of the invention, the chamber is then flushed with an inert gas, such as nitrogen, to insure that the chamber atmosphere has only a small oxygen content (i.e., 2% air or less). The scrap is then heated to a selected temperature depending on the boiling point of oil and the degree of vacuum in the chamber, normally the temperature will be between 150° F. and 1100° F. One method of heating the scrap is by circulating within the chamber a heated inert gas which will raise the temperature of the scrap to a selected temperature, preferably about 650° F., to vaporize the oil on the scrap. It should be understood, however, that other methods of heating the scrap are contemplated, such as radiant heaters, contact strips, etc. The temperature required to vaporize the oil is below the normal boiling point of the oils, because of the reduced pressure in the system. Furthermore, the heating cycle time is also decreased because of the reduced pressure. The oil vapors mix with the inert gas and a portion of the mixture is withdrawn or removed from the chamber so that the oil can be condensed by a suitable device such as a heat exchanger, the oil being separated and directed to recovery storage tanks. The inert gas can then be either reheated and recirculated through the chamber or exhausted to atmosphere and a fresh supply of clean inert gas introduced into the chamber. The mixture removal will continue until the mixture being moved from the chamber is relatively free of oil. The length of the various steps of the process cycle have been determined by experimentation and it has been found that a timed cycle is the simplest method of operating the equipment. A more accurate method of determining when most of the oil has been removed would be to sample the effluent from the chamber.

At the completion of the vaporization step, the process can provide for a cooling step. In the cooling step, a cooled inert gas is circulated through the chamber so that the temperature of the scrap is reduced to about 200° F. to 500° F. After the cooling step, the vacuum is released and the scrap removed from the chamber. The oil-free scrap is either charged into a melting furnace or is allowed to further cool and then used at a later date.

Figure 1:
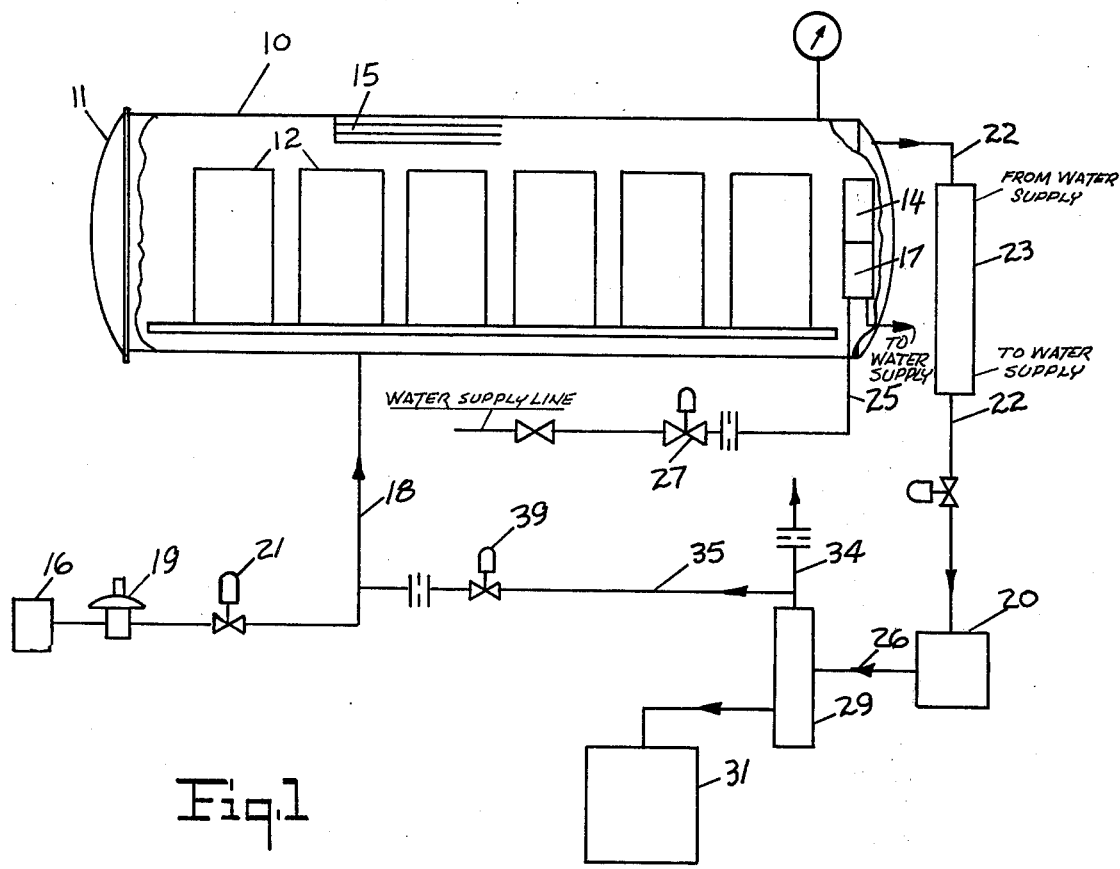
FIG. 1 is a schematic of one embodiment of the vacuum deoiling apparatus according to the present invention.

The system used in carrying out the above-described process in its preferred embodiment is illustrated in FIG. 1. The numeral 10 in FIG. 1 indicates a hermetically sealable chamber approximately 30' in length by 10' in diameter into which a plurality of bales, briquets or bins 12 of an oil-laden metal scrap can be introduced. A circulating fan 14, radiant heating tubes 15 and cooling unit 17 are carried within the chamber; and, although the use is indicated in the description, the drawings do not indicate the exact position of the various elements. The position of these elements within the chamber would be within the ambit of one skilled in the art. Inert gas such as nitrogen is supplied to the chamber 10 through a line 18 which is connected to a suitable source 16 such as a gas generator. An automatically controlled flow regulator 19 and an on-off valve 21 are carried in line 18 to provide control of the flow of inert gas into the chamber. The fan 14 is reversible and at periodic intervals during the heating and cooling steps of the deoiling cycle, the fan is reversed, thus, reversing the wind flow or current of the heated gas within the chamber to even out the temperature from end to end. The heating elements 15 can be of any suitable type, but preferably they are of the radiant tube type which can be heated by appropriate burner assemblies all of which are commercially available components. The cooling unit or coil 17 is connected through line 25 and valve 27 to a cool water supply and cool water is circulated through the coils during a cooling step to cool the atmosphere which is being circulated in the chamber.

The cooling step can be enhanced by providing a system to circulate ambient air through the radiant heater tubes 15.

A vacuum pump 20 is provided and is connecting to the chambers through line 22 and a heat exchanger 23. The heat exchanger cools the effluent drawn from the chamber by the vacuum pump. The effluent mixture from the chamber is normally the inert gas and the vaporized oil which has a temperature of about 650° F. The heat exchanger cools this effluent mixture to about 200° F. to condense the oil from the mixture. The condensed oil and gas mixture pass from the vacuum pump through line 26 into a separator 29 where the liquid oil is separated from the gas. When the oil level has reached a predetermined level in the separator, the oil is pumped into a storage tank 31. The gas exiting from the separator is primarily the inert gas and is either vented to atmosphere through line 34 or is recirculated through the system by line 35 and line 18 if valve 39 is open and valve 37 is closed.

This preferred embodiment of the deoiler apparatus operates in the following manner. The metal scrap 12 is placed in the chamber 10 and the door 11 is closed, hermetically sealing the chamber. The vacuum pump 20 is operated until a pressure of between 2 to 8 in. of mercury absolute is achieved, preferably the vacuum should be about 5 in. of mercury absolute. It has been determined that such a pressure can be obtained within 15 to 25 minutes depending on the volume of vessel 10 and the capacity of vacuum pump 20. Upon completion of this evacuation step, inert gas is introduced into the chamber from source 16 through line 18 to flush the chamber of residual air. The inert gas is at ambient temperature and introduced at a flow rate of about 4,000 SCFH (Standard Cubic Feet per Hour). As the gas is introduced into the chamber, the pressure in the chamber is raised to about 10 in. of mercury absolute in between 15 to 25 minutes. At this point, the oxygen content of the chamber atmosphere is about 2%. Although the flushing step is preferable in the preferred embodiment of the process, it is not absolutely necessary since the vacuum pump can be used to remove most of the air from the chamber.

The next step in the deoiling process is to heat the contaminated scrap. This can be done in several ways and its primary objective is to heat the scrap to between 500° F. to 750° F. since the rolling mill oil used in processing aluminum has a boiling point temperature of about 300° F. to about 700° F. However, the selected temperature of the scrap will be based on the boiling point of the oil and the degree of vacuum drawn into the system.

In the preferred embodiment illustrated in FIG. 1, the heating step is accomplished by heating the inert gas and circulating it around the scrap. The radiant heating tubes 15 are heated by burners and, in turn, heat the inert gas which continues to be introduced into the chamber at about 4,000 SCFH. The circulating fan 14 circulates the heated gas around the scrap. During the initial stage of the heating step, the pressure in the chamber is increased to about 20 in. of mercury absolute. This pressure is held for approximately one (1) hour at which time the pressure is increased to slightly below atmospheric pressure, preferably about 25 in. of mercury absolute. The pressure is increased to permit as much inert gas as possible to be in the chamber for heating purposes while still maintaining a negative pressure in the event of leakage in the system and to avoid hot gas from leaking from the system. The more inert gas, the better the heat transfer. At approximately one and one-half hours into the heating phase, the temperature of the atmosphere in the chamber is approximately 700° F. The circulating fan 14, which circulates the heated inert gas within the chamber, is reversed at periodic intervals to change the direction current flow to insure a more even heating pattern. After about four and one-half hours, the inert gas flow rate is reduced to about 2,000 SCFH, while the pressure is maintained at approximately 25 in. of mercury absolute. This lower flow rate permits a soak step to help to even the temperature of the scrap to about 650° F.

During the heating step, small quantities of the chamber atmosphere, which is a mixture of inert gas and vaporized oil, are drawn out by the vacuum system. The oil vaporized in the mixture is condensed by the heat exchanger or vapor cooler 23 and separated in separator 29.

After the temperature of the scrap has reached about 650° F., the heating step is terminated and a second evacuating step is initiated. In this second evacuating step, the vacuum pump 20 is used to withdraw the inert gas and vaporized oil mixture from the chamber. During the evacuation, the inert gas flow into the chamber remains at 2,000 SCFH and the temperature of the atmosphere is maintained at about 650° F. The pressure is lowered to about 5 in. of mercury absolute in approximately 20 minutes and the vaporization rate of the oil increases. It is during this evacuation phase that most of the oil is removed from the scrap although, as previously mentioned, some oil is also removed during the heating phase. The sensible heat of the scrap is used to vaporize the oil.

For example, the oil removal rate under this heat and vacuum treatment is as follows. Because of the relatively low latent heat of the rolling mill oil (about 100 BTUs per pound), the low concentration of the oil in the scrap and the relatively high sensible heat (0.25 BTUs per pound/° F.) of aluminum, the scrap can be heated by gas convection to a temperature of approximately 100° above the vacuum boiling point of the oil and then the vacuum is applied to vaporize the oil. Sample calculation shows: if the vacuum boiling point of the oil is 500° F. and one pound of aluminum is heated to 600° F., heat available to evaporate the oil at 500° F. is (600°–500°) × 0.25 or 25 BTU. When the oil has a latent heat of 100 BTU/lb. and a sensible heat of 0.30 BTU/lb. per ° F., the amount of oil evaporated from one pound of aluminum can be calculated as follows:

Let X = lbs. of oil on 1 lb. aluminum and heat required to evaporate X lbs. of oil = (100–(600°–500°) × 0.30) × X = 70X As shown above, 25 BTU are available from the aluminum so 70X = 25 and X = 25/70 or X = 0.357 lbs. oil from 1 lb. aluminum Therefore:

The oil is 0.357/1.357 or 26.3% of the scrap.

This is the oil content of the scrap which can be removed by sensible heat if the aluminum scrap is heated 100° F. above the vacuum boiling point of the oil and all available heat is used.

The cooling step is utilized to reduce the temperature of the scrap before removing it from the furnace. During the cooling step, a low nitrogen flow rate of about 2,000 SCFH is maintained. The cool inert gas is circulated through the chamber by the circulating fan 14. The gas may be cooled by two methods. The cooling unit 17 is used as a heat exchanger to absorb the heat in the chamber atmosphere through the use of a cool water circulating through the cooling coils. Furthermore, if desired, ambient air can be injected into the radiant heating tubes 15 which also aid in the heat transfer. When the scrap is cooled to a desired temperature, the chamber is brought to atmospheric pressure by venting.

As is shown in FIG. 1, during the heating step, the deoiled inert gas which is removed from the chamber can either be vented to atmosphere through line 34 or directed through line 35 and valve 39 into inlet line 18 and recirculated through the system.

Figure 2:
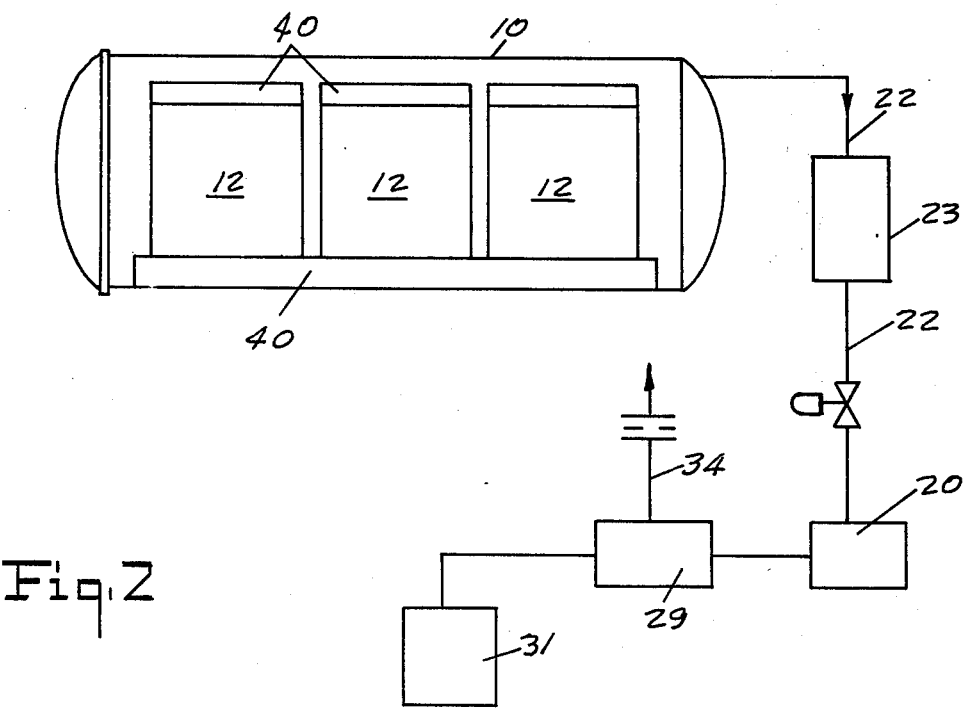
FIG. 2 is a schematic of a second embodiment of the vacuum deoiling apparatus which utilizes a contact heater to heat the metal scrap.

Furthermore, as illustrated in FIG. 2, the scrap in the form of blocks 12 can be heated in the chamber 10 by the use of electrical contact heaters 40 which engage the blocks to raise the temperature of the scrap. This heating method can be utilized with or without an inert atmosphere. For example, if it were used without an inert atmosphere, the vacuum pump 20 would be used to remove the air (oxygen) from the chamber and vacuumize the chamber. The contact heaters which could be of any desired type heat the blocks 12 to the proper temperature. While the chamber is vacuumized, the oil is vaporized and the vaporized oil is withdrawn from the system and condensed for storage as has been described hereinabove.

As can easily be understood, the contact heaters 40 could also be used in an inert environment with or without the recirculation system as illustrated in FIG. 1.

It can be seen from the above description and drawings that the method and deoiling apparatus described hereinabove provides the means for removing volatile oil from metal scrap, will aid in increasing the amount of recovery of the scrap and will eliminate burning of the vaporized oil in order to aid in maintaining air quality standards. By the use of a vacuum, the temperature at which oil will vaporize is reduced and, thus, the cycle time in which the scrap is processed is also reduced.

As will be apparent to those skilled in the art, there are many variations and changes which can be made to the deoiling apparatus; for example, the method of circulating the inert gas, the type of inert gas used; however, these and other variations and changes can be made to the invention as above described and illustrated without departing from the true spirit and scope thereof and defined in the following claims.

We claim:

1. A method of removing oil from metal scrap, comprising the steps of:
   (a) introducing an oil laden scrap into a hermetically sealable chamber;
   (b) evacuating said chamber;
   (c) introducing an inert gas into said chamber after evacuation to flush the chamber of air;
   (d) heating said inert gas within said chamber until the scrap metal is raised to a selected temperature;
   (e) reducing the pressure in said chamber after the metal has obtained the selected temperature by withdrawing the chamber atmosphere which includes a mixture of inert gas and vaporized oil; and
   (f) continuously introducing the inert gas into the chamber as the atmosphere within the chamber is being withdrawn.

2. The method of claim 1, wherein said heating step further includes increasing the amount of inert gas in said chamber while maintaining a slight negative pressure within said chamber.

3. The method of claim 1, further including the steps of reducing the temperature of the scrap metal prior to returning the chamber to atmospheric pressure.

4. The method of claim 3, wherein the step of reducing the temperature of said heated scrap metal includes:
   (a) cooling the gas within the chamber; and
   (b) circulating the cooled gas around the heated metal scrap.

5. The method of claim 1, wherein said inert gas is nitrogen.

6. The method of claim 1, wherein said metal scrap is heated to between 150° and 1100° F.

7. The method of claim 1, wherein said selected temperature is at least 500° F.

8. A method of removing oil from oil-laden metal scrap comprising the steps of:
   (a) introducing said oil-laden scrap into the hermetically sealable chamber;
   (b) evacuating the chamber to remove the air;
   (c) flushing said chamber with an inert gas;
   (d) raising the temperature of the said metal scrap to a selected level by heating the inert gas and circulating said heated gas around the scrap metal;
   (e) during said heating step, increasing the amount of inert gas in the chamber while maintaining a slightly negative pressure within said chamber;
   (f) after said scrap has attained said selected temperature, reducing the pressure in said chamber, whereby the sensible heat of the scrap metal and oil will vaporize the majority of said oil; and
   (g) removing the majority of the vaporized oil from said chamber as the pressure in the chamber is reduced.

* * * * *